US009294638B2

(12) United States Patent
Umezawa et al.

(10) Patent No.: US 9,294,638 B2
(45) Date of Patent: Mar. 22, 2016

(54) INFORMATION PROCESSING SYSTEM, INFORMATION PROCESSING APPARATUS, INFORMATION PROCESSING METHOD, AND COMPUTER-READABLE STORAGE MEDIUM

(71) Applicants: Asaki Umezawa, Tokyo (JP); Mikane Tago, Kanagawa (JP); Daisuke Taniuchi, Tokyo (JP); Sachiko Fukumaru, Tokyo (JP); Ryo Furutani, Kanagawa (JP); Tomoki Shibukawa, Kanagawa (JP); Fumiyoshi Kittaka, Kanagawa (JP)

(72) Inventors: Asaki Umezawa, Tokyo (JP); Mikane Tago, Kanagawa (JP); Daisuke Taniuchi, Tokyo (JP); Sachiko Fukumaru, Tokyo (JP); Ryo Furutani, Kanagawa (JP); Tomoki Shibukawa, Kanagawa (JP); Fumiyoshi Kittaka, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/478,401

(22) Filed: Sep. 5, 2014

(65) Prior Publication Data

US 2015/0070726 A1   Mar. 12, 2015

(30) Foreign Application Priority Data

Sep. 11, 2013 (JP) .................................. 2013-188669
Aug. 19, 2014 (JP) .................................. 2014-166935

(51) Int. Cl.
*G06F 3/12* (2006.01)
*H04N 1/00* (2006.01)

(52) U.S. Cl.
CPC ....... *H04N 1/00416* (2013.01); *H04N 1/00408* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| 2002/0080376 | A1 | 6/2002 | Momose et al. |
| 2003/0070061 | A1 | 4/2003 | Wong et al. |
| 2005/0064814 | A1 | 3/2005 | Matsuo et al. |
| 2006/0206835 | A1 | 9/2006 | Chaudhri et al. |
| 2006/0262338 | A1 | 11/2006 | Momose et al. |
| 2007/0232232 | A1 | 10/2007 | Matsuo et al. |
| 2008/0068636 | A1 | 3/2008 | Momose et al. |
| 2009/0046057 | A1* | 2/2009 | Umezawa ........... G06F 3/04886 345/156 |
| 2009/0103828 | A1 | 4/2009 | Shibukawa et al. |

(Continued)

FOREIGN PATENT DOCUMENTS

| JP | 2003-330713 | 11/2003 |
| JP | 2005-045557 | 2/2005 |

(Continued)

OTHER PUBLICATIONS

U.S. Appl. No. 14/197,406, filed Mar. 5, 2014.

*Primary Examiner* — Marcus T Riley
(74) *Attorney, Agent, or Firm* — Oblon, McClelland, Maier & Neustadt, L.L.P.

(57) ABSTRACT

An information processing system includes a main body that executes a plurality of functions; and an operation unit including a display unit to display a screen. The system also includes a first display controller that arranges, for each of the functions, a first display component in a home screen corresponding to the screen displayed on the display unit immediately after activation, the first display component being used to instruct an execution command for the each of the functions; and an execution controller that controls, when the first display component is pressed, the main body to perform a function corresponding to the pressed first display component.

10 Claims, 9 Drawing Sheets

(56) References Cited

U.S. PATENT DOCUMENTS

| | | |
|---|---|---|
| 2009/0125815 A1 | 5/2009 | Chaudhri et al. |
| 2010/0195153 A1 | 8/2010 | Momose et al. |
| 2013/0027736 A1 | 1/2013 | Kittaka |
| 2013/0044354 A1 | 2/2013 | Momose et al. |
| 2013/0074008 A1 | 3/2013 | Umezawa et al. |
| 2013/0113823 A1 | 5/2013 | Umezawa et al. |
| 2013/0163019 A1 | 6/2013 | Tago et al. |
| 2013/0242332 A1 | 9/2013 | Momose et al. |
| 2014/0082747 A1 | 3/2014 | Negoro et al. |
| 2014/0130101 A1 | 5/2014 | Yoshitani et al. |
| 2014/0146338 A1 | 5/2014 | Momose et al. |
| 2014/0160530 A1 | 6/2014 | Kittaka |
| 2014/0226181 A1* | 8/2014 | Shibukawa ........ H04N 1/00127 358/1.15 |
| 2014/0258913 A1 | 9/2014 | Shibukawa et al. |

FOREIGN PATENT DOCUMENTS

| | | |
|---|---|---|
| JP | 2011-175606 | 9/2011 |
| JP | 2011-205254 | 10/2011 |
| JP | 5087699 | 9/2012 |
| JP | 2013-021548 | 1/2013 |
| JP | 2013-021673 | 1/2013 |

* cited by examiner

INFORMATION PROCESSING SYSTEM, INFORMATION PROCESSING APPARATUS, INFORMATION PROCESSING METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2013-188669 filed in Japan on Sep. 11, 2013 and Japanese Patent Application No. 2014-166935 filed in Japan on Aug. 19, 2014.

BACKGROUND OF THE INVENTION

1. Field of the Invention

The present invention relates to an information processing system, an information processing apparatus, an information processing method, and a computer-readable storage medium.

2. Description of the Related Art

Conventionally, there is known a technology of displaying a display component (UI component) to instruct an execution command of a function which can be provided by an application installed in a device. For example, there is known a technology in which, when a user selects one of a plurality of icons disposed on a home screen, the display is switched to an initial screen of an application corresponding to the selected icon and a start button to instruct the execution command of the function provided by the application is displayed on the initial screen.

However, in the technology of the related art, in a case where the user instructs the execution of the function which can be provided by the application, the user first selects an icon corresponding to the application on the home screen, and then the display is switched to the initial screen corresponding to the application. Thereafter, the start button displayed on the initial screen is necessarily pressed to make an operation. Therefore, there is a problem in that operational efficiency for the user is degraded.

Therefore, there is a need to provide an information processing system, an information processing apparatus, an information processing method, and a computer-readable storage medium through which operational efficiency can be improved when the user instructs the execution of a function realizable in a device.

SUMMARY OF THE INVENTION

It is an object of the present invention to at least partially solve the problems in the conventional technology.

According to an embodiment, there is provided an information processing system that includes a main body that executes a plurality of functions; an operation unit including a display unit to display a screen; a first display controller that arranges, for each of the functions, a first display component in a home screen corresponding to the screen displayed on the display unit immediately after activation, the first display component being used to instruct an execution command for the each of the functions; and an execution controller that controls, when the first display component is pressed, the main body to perform a function corresponding to the pressed first display component.

According to another embodiment, there is provided an information processing apparatus that functions as an operation unit of a device in which a plurality of functions is executable. The information processing apparatus includes a first display controller that arranges, for each of the functions, a first display component in a home screen corresponding to the screen displayed on the display unit immediately after activation, the first display component being used to instruct an execution command for the each of the functions; and an execution controller that controls, when the first display component is pressed, the main body to perform a function corresponding to the pressed first display component.

According to still another embodiment, there is provided an information processing method that includes arranging, for each of a plurality of functions, a first display component in a home screen corresponding to the screen displayed on the display unit immediately after activation, the first display component being used to instruct an execution command for the each of the functions; and controlling, when the first display component is pressed, a device to perform a function corresponding to the pressed first display component.

According to still another embodiment, there is provided a non-transitory computer-readable storage medium with an executable program stored thereon and executed by a computer. The program instructs the computer to perform the information processing method according to the above embodiment.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An information processing system, an information processing apparatus, an information processing method, and a computer-readable storage medium according to the invention will be described in detail below with reference to the accompanying drawings. In the following, a multifunction peripheral (MFP) will be given as an example of the information processing system. In addition, the MFP is an apparatus having at least two of a printer function, a copy function, a scanner function, and a facsimile function.

Figure 1:
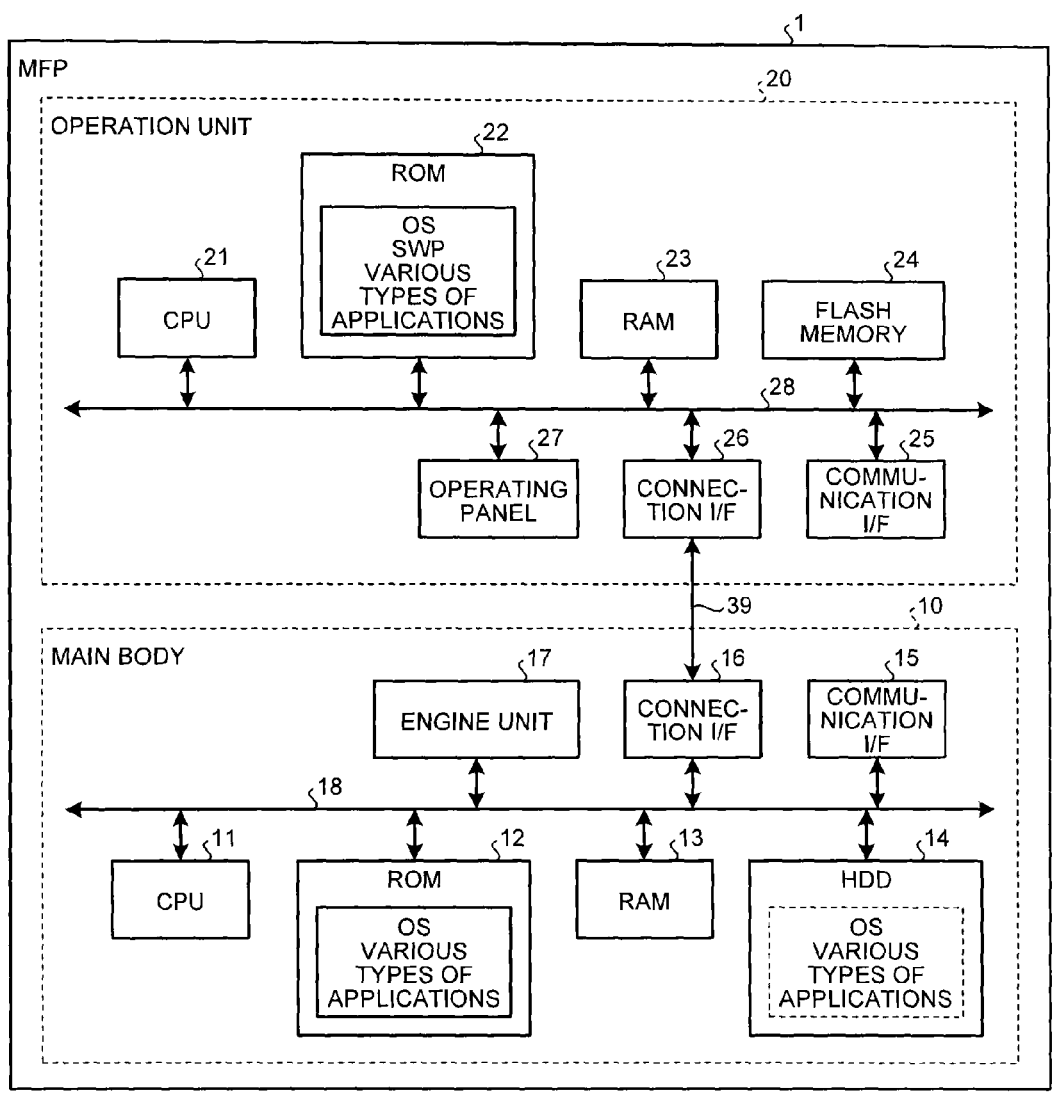
FIG. 1 is a diagram illustrating an example of a hardware configuration of an MFP according to an embodiment.

FIG. 1 is a diagram illustrating a hardware configuration of an MFP 1 according to the embodiment. As illustrated in FIG. 1, the MFP 1 includes a main body 10 which is configured to realize various types of functions such as a copy function, a scanner function, a facsimile function, and a printer function, and an operation unit 20 which receives an input according to an operation of an operator. The main body 10 and the operation unit 20 are connected to make communication with each other through a dedicated communication channel 39. The communication channel 39, for example, can employ a universal serial bus (USB) standard, but any standard may be employed regardless of a wired or wireless manner.

In addition, the main body 10 can make an operation according to the input received by the operation unit 20. Further, the main body 10 can make communication with even an external apparatus such as a client PC (Personal Computer), and can make an operation according to an instruction received from the external apparatus.

The main body 10 includes a CPU 11, a ROM 12, a RAM 13, a hard disk drive (HDD) 14, a communication interface (I/F) 15, a connection I/F 16, and an engine unit 17, all of which are connected to each other through a system bus 18. The CPU is an abbreviation for "Central Processing Unit". The ROM is an abbreviation for "Read Only Memory". The RAM is an abbreviation for "Random Access Memory".

In the ROM 12, a copy application program (hereinafter, simply referred to as a copy application) and a scanner application program (hereinafter, simply referred to as a scanner application) are stored besides an OS (Operating System) program. Further, in the ROM 12, a facsimile application program (hereinafter, simply referred to as a facsimile application) and a printer application program (hereinafter, simply referred to as a printer application) are stored. Furthermore, various types of programs are stored in the ROM 12. In addition, the description is made such that the above-mentioned various types of programs are stored in the ROM 12, but these programs may be stored in the HDD 14.

The CPU 11 integrally controls the operations of the main body 10. The CPU 11 executes the programs stored in the ROM 12 or the HDD 14 using the RAM 13 as a work area to control the entire operations of the main body 10, and the above-mentioned various types of functions such as the copy function, the scanner function, the facsimile function, and the printer function are realized.

The communication I/F 15 is an interface to communicate with the external apparatus such as the client PC (Personal Computer). The connection I/F 16 is an interface to communicate with the operation unit 20 through the communication channel 39.

The engine unit 17 is configured in hardware for processes other than a general-purpose information processing and communication in order to realize the copy function, the scanner function, the facsimile function, and the printer function. For example, a scanner (image reading unit) which scans and reads an image on a document, a plotter (image forming unit) which performs a printing operation on a sheet material such as paper, and a facsimile unit which performs a facsimile communication. Further, specific options such as a finisher which classifies the printed sheet materials or an auto document feeder (ADF) which automatically feeds the document may be provided.

Next, the operation unit 20 includes a CPU 21, a ROM 22, a RAM 23, a flash memory 24, a communication I/F 25, a connection I/F 26, and an operating panel 27, all of which are connected to each other through a system bus 28.

The operation unit 20 makes communication with the main body 10 to perform information processing while maintaining cooperation with the main body 10. Therefore, the operation unit 20 is configured to include an OS (Operating System) program in the ROM 22 in order to perform the information processing independently of the main body 10. Further, similarly to the ROM 12 of the main body 10, the copy application, the scanner application, the facsimile application, and the printer application are stored in the ROM 22.

Further, the ROM 22 of the operation unit 20 stores a setting widget program (SWP) to display a widget on a home screen (a screen corresponding to a so-called disk top screen) of the MFP 1 displayed on the operating panel 27. For example, the SWP is a program to display a setting widget on the home screen. The setting widget, which may be referred to as "a third display component", includes a setting button, which may be referred to as "a second display component", corresponding to current setting values of various types of functions such as the copy function or the printer function, and a start button, which may be referred to as "a first display component", to instruct various types of functions to start. The details will be described below. In addition, the home screen is a screen which is displayed immediately after the MFP 1 is powered up and serves as a basic body of all operations (base point).

The CPU 21 integrally controls the operations of the operation unit 20. The CPU 21 executes a program stored in the ROM 22 or the flash memory 24 or the like using the RAM 23 as a work area. Therefore, the CPU 21 controls the entire operations of the operation unit 20, and realizes various types of functions to be described below such as displaying of information (image) according to an input from a user.

The communication I/F 25 is an interface to communicate with a server apparatus for example through a network such as the Internet or a local area network (LAN). The connection I/F 26 is an interface to communicate with the main body 10 through the communication channel 39.

The operating panel 27 is a so-called touch panel which is integrally formed with a touch detector made of a transparent electrode and a liquid crystal display unit. The operating panel 27 receives various inputs from a touch operation of the operator, and displays various types of information (for example, information according to the received input, information indicating an operation state of the MFP 1, information indicating a setting state, and the like). In addition, the operating panel 27 has been described to include the touch detector and the liquid crystal display unit, but the invention is not limited thereto. For example, an organic EL (Electroluminescence) display unit may be used instead of the liquid crystal display unit.

The operation unit 20 which includes the operating panel 27 may be a portable terminal apparatus such as a tablet terminal or a smart phone. In this case, the operation unit 20 is provided with a wireless communication function. Further, the operation unit 20 is detachably provided in the main body 10. Then, when being attached to the main body 10, the operation unit 20 makes a wired communication with the main body 10 through the respective connection I/Fs 16 and 26. Further, when being detached from the main body 10, the operation unit 20 makes communication with the main body 10 by the wireless communication function.

Figure 2:
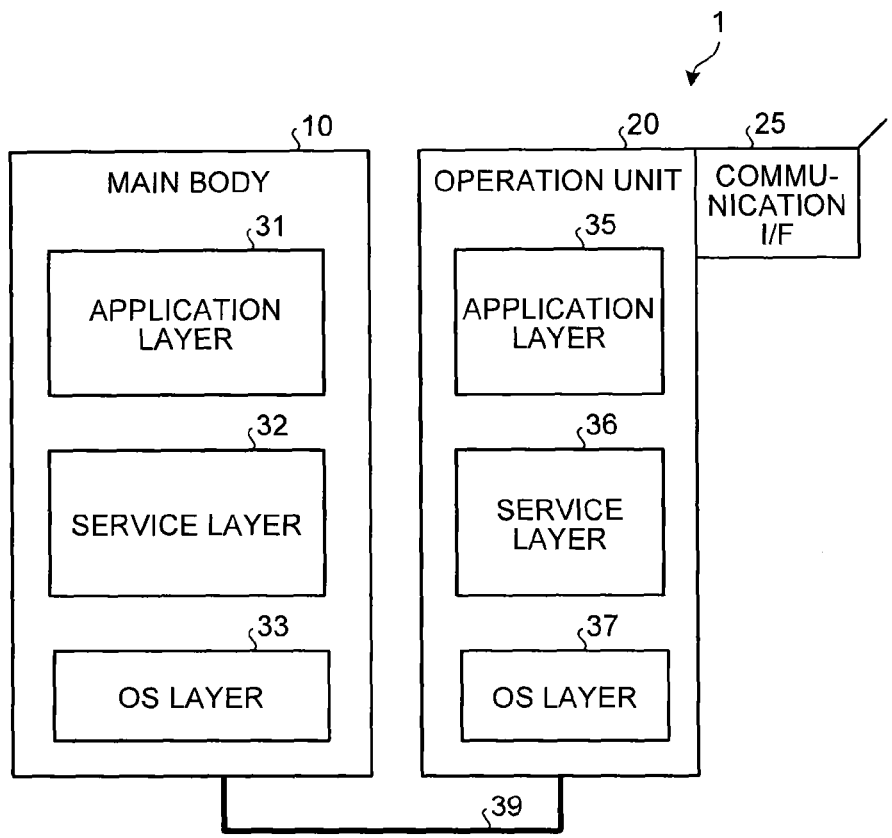
FIG. 2 is a schematic diagram illustrating an example of a software configuration of the MFP.

Next, a software configuration of the MFP 1 will be described. FIG. 2 is a schematic diagram illustrating an example of the software configuration of the MFP 1. As illustrated in FIG. 2, the main body 10 includes an application layer 31, a service layer 32, and an OS layer 33. The entities of the application layer 31, the service layer 32, and the OS layer 33 are various types of software stored in the ROM 12 (or the HDD 14). Various types of functions are provided when the CPU 11 executes these types of software.

The software of the application layer 31 is an application to provide a predetermined function by operating a hardware resource. Examples of the application include the copy application to provide the copy function, the scanner application to provide the scanner function, the facsimile application to provide the facsimile function, and the printer application to provide the printer function.

The software of the service layer 32 is software for providing an interface which is interposed between the application layer 31 and the OS layer 33 to use the hardware resource included in the main body 10 for the AP. More specifically, the software of the service layer 32 is software for providing a function of receiving an operation request for the hardware resource and of adjusting the operation request. For example, the operation request received by the service layer 32 is a request for a reading operation by the scanner or a printing operation by the printer.

In addition, an interface function of the service layer 32 is provided also to an application layer 35 of the operation unit 20 as well as the application layer 31 of the main body 10. In other words, the application layer 35 of the operation unit 20 can also realize a function which uses the hardware resource (for example, the engine unit 17) of the main body 10 through an interface function of the service layer 32.

The software of the OS layer 33 is basic software (operating system) for providing a basic function of controlling hardware included in the main body 10. The software of the service layer 32 converts a request from various types of application s for using the hardware resource into a command which can be interpreted by the OS layer 33, and transfers the command to the OS layer 33. Then, the command is performed by the software of the OS layer 33, so that the hardware resource is performed according to the request from the application.

Similarly, the operation unit 20 includes the application layer 35, a service layer 36, and an OS layer 37. The application layer 35, the service layer 36, and the OS layer 37 included in the operation unit 20 have also the same hierarchical structure as that of the main body 10. In addition, the function provided by the application of the application layer 35 and the types of operation requests which can be received by the service layer 36 are different from those of the main body 10. The application of the application layer 35 may be software which operates the hardware resource included in the operation unit 20 to provide a predetermined function, and generally includes software for providing a function of user interface (UI) through which the functions (the copy function, the scanner function, the facsimile function, and the printer function) included in the main body 10 are operated and displayed.

In addition, the software of the OS layer 33 of the main body 10 and the software of the OS layer 37 of the operation unit 20 are different from each other due to independency of the functions as described above. In other words, the main body 10 and the operation unit 20 are operated independently of each other by separate OSs. For example, Linux (registered trademark) may be used as the software of the OS layer 33 of the main body 10, and Android (registered trademark) may be used as the software of the OS layer 37 of the operation unit 20.

As described above, since the MFP 1 is configured to operate the main body 10 and the operation unit 20 using the separate OSs, the communication between the main body 10 and the operation unit 20 is performed as communication between different apparatuses not between processes in a common apparatus. An operation (command transmission) that the operation unit 20 transfers the received input (an instruction from the operator) to the main body 10, or an operation that the main body 10 informs the operation unit 20 of an event corresponds to the above communication. Herein, the operation unit 20 can use the function of the main body 10 by performing the command transmission to the main body 10. Further, examples of the event to be informed from the main body 10 to the operation unit 20 include an execution state of the operation in the main body 10 and a setting content of the main body 10.

In addition, in this example, an OS (for example, Linux (registered trademark)) installed in the main body 10 may be referred to as "a first operating system", and an OS (for example, Android (registered trademark)) installed in the operation unit 20 may referred to as "a second operating system".

Figure 3:
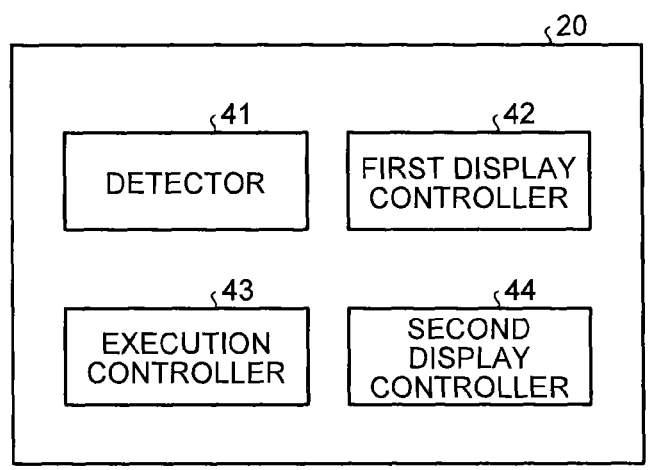
FIG. 3 is a block diagram illustrating an example of a functional configuration of an operation unit.

FIG. 3 is a block diagram illustrating an example of a functional configuration of an operation unit 20. For the convenience of explanation, FIG. 3 mainly illustrates the functions according to the invention, but the functions of the operation unit 20 are not limited thereto. As illustrated in FIG. 3, the operation unit 20 includes a detector 41, a first display controller 42, an execution controller 43, and a second display controller 44. From a different point of view, the programs (for example, the setting widget program and various types of APs) stored in the ROM 22 of the operation unit 20 can be considered to cause the CPU 21 to operate as the detector 41, the first display controller 42, the execution controller 43, and the second display controller 44. In addition, in this example, the detector 41, the first display controller 42, the execution controller 43, and the second display controller 44 will be described to be realized as software functions, but some or all of them may be realized in hardware.

The detector 41 makes communication with various types of applications stored in the ROM 12 through the CPU 11 of the main body 10, for example, at a predetermined interval such as 10 seconds or 1 minute and thus detects various setting values which are set in the application of the main body 10 at that time. Further, the detector 41 stores the various detected setting values of the application of the main body 10 in the RAM 23 or the flash memory 24 for example as various setting values of the application of the operation unit 20. Therefore, various setting values which are set in the application of the main body 10 are reflected as various setting values of the application of the operation unit 20.

For the various types of applications (the respective functions of a plurality of types which can be performed by the main body 10), the first display controller 42 displays a setting widget which includes the respective setting buttons to display the various setting values reflected on the application of the operation unit 20 by the detector 41 and a start button to issue an execution command for the function provided by the application to be performed in the home screen. From a different point of view, each of the various types of applications may be considered such that the first display controller 42 provides the start button used to instruct the execution command for the function provided by the application in the home screen displayed in the operating panel 27 immediately after the MFP 1 is powered up. Further, the above-described setting buttons include buttons which display various setting values at that time and are used to display the setting screen of setting items corresponding to the setting values.

When the start button is pressed, the execution controller 43 causes the main body 10 to perform a function corresponding to the start button (the pressed start button) which is pressed. For example, in a case where the start button disposed in the setting widget corresponding to the copy application is pressed, the copy function is performed by the main body 10. More specifically, when it is detected that the start button disposed in the setting widget corresponding to the copy application is pressed, the CPU 21 requests a copy operation of the main body 10 (the engine unit 17). Therefore, the main body 10 (the engine unit 17) is configured to perform (start) a copy operation in the current setting values.

When the setting button is pressed, the second display controller 44 displays the setting screen corresponding to the pressed setting button on the operating panel 27.

Figure 4:
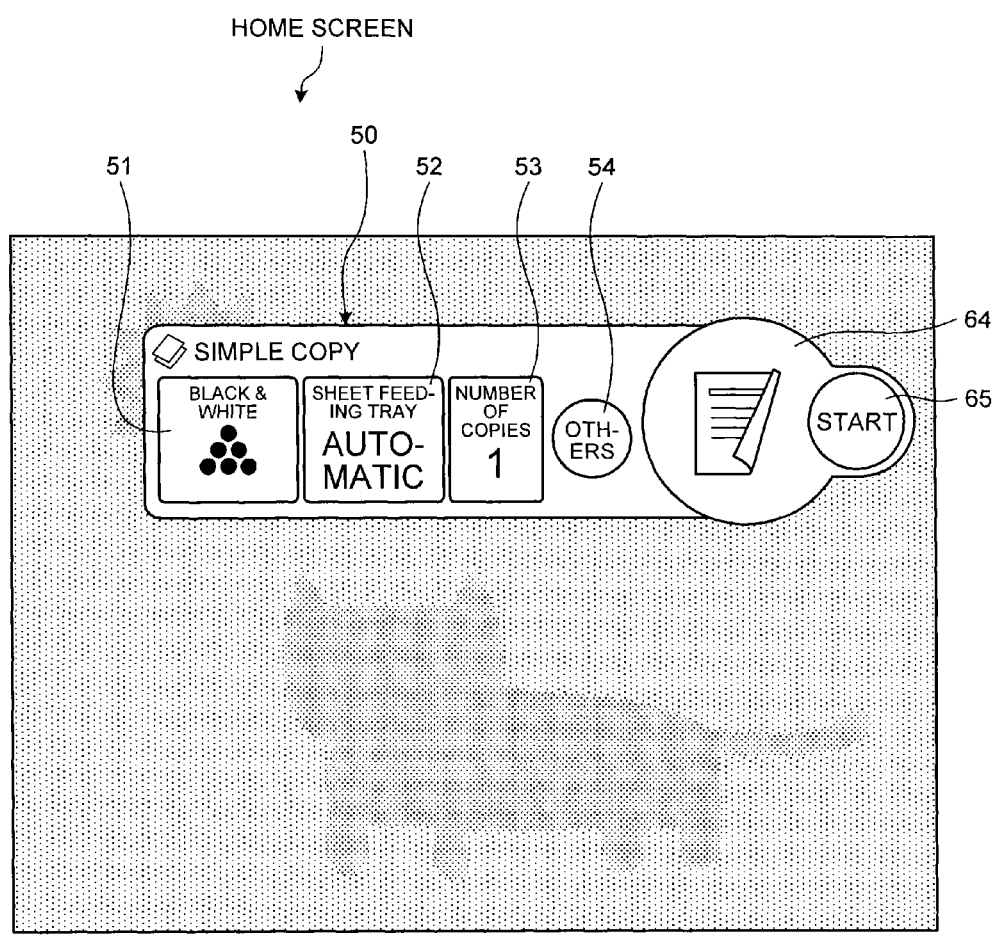
FIG. 4 is a diagram illustrating an example of a setting widget which is displayed in a home screen.
Figure 5:
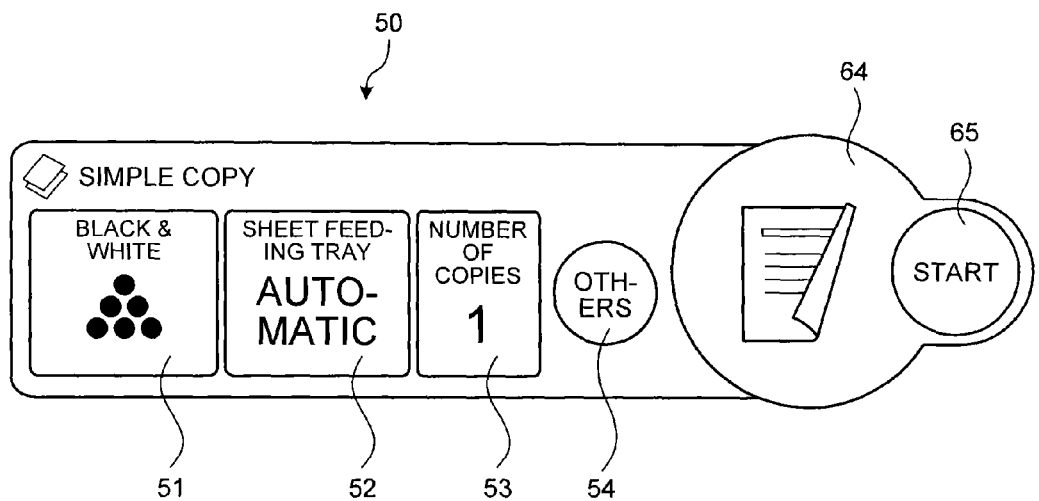
FIG. 5 is an enlarged view of the setting widget.

FIG. 4 illustrates an example of the home screen which is displayed on the operating panel 27. Herein, the description will be made about an example in which a setting widget 50 corresponding to the copy function is disposed on the home screen. Further, FIG. 5 illustrates an enlarged view of the setting widget 50. The setting widget 50 illustrated in FIGS. 4 and 5 displays first to fourth setting buttons 51 to 54, an output result icon 64 which displays an output result using an icon, and a start button 65 which is used to instruct a copy start.

The first setting button 51 is a button to designate a display mode of a color setting screen in which a color used in printing is set. In this example, the first setting button is configured to designate a color to be used in printing from among "Black & White", "Auto color", and "Full color" for example. The example of FIGS. 4 and 5 illustrates a state where "Black & White" is set by the operator (user). In this case, the CPU 21 of the operation unit 20 displays the characters of "Black & White" on the first setting button 51 of the setting widget 50 according to the SWP. Therefore, the operator confirms the current setting of "Black & White" as a color to be used in printing.

The second setting button 52 is a button to designate a display mode of the setting screen (a tray setting screen) of a tray from which a sheet is fed. In this example, the second setting button is configured to designate a desired setting from among "Automatic sheet feeding", "Bypass tray", "Tray 1", and "Tray 2" for example. The example of FIGS. 4 and 5 illustrates a state where "Automatic sheet feeding" is set by the operator. In this case, the CPU 21 of the operation unit 20 displays the characters of "Automatic" on the second setting button 52 of the setting widget 50 according to the SWP. Therefore, the operator confirms that the sheet feeding tray is set to be automatically fed.

The third setting button 53 is a button to designate a display mode of a copy number setting screen through which the number of copies is set. As will be described below, when the copy number setting screen is designated to be displayed in this example, a ten key indicating "0" to "9" is displayed. The operator operates the ten key to input a desired number of copies. The example of FIGS. 4 and 5 illustrates a state where the number of copies is set to "1 copy" by the operator. In this case, the CPU 21 of the operation unit 20 displays the character of "1" on the third setting button 53 of the setting widget 50 according to the SWP. Therefore, the operator confirms a state where the number of copies is set to "1".

In addition, the setting arrangement of the color setting→the tray setting→the setting through a copy number setting button assigned in the first to third setting buttons 51 to 53 is made for the operator to naturally setup the printing settings.

The fourth setting button 54 is a button to designate a display mode of other setting screens. The CPU 21 of the operation unit 20 displays the characters of "Others" on the fourth setting button 54 of the setting widget 50 according to the SWP. In the setting widget 50, the first to third setting buttons 51 to 53 are assigned with the setting items in a descending order of an update frequency of the settings. In other words, in the example illustrated in FIGS. 4 and 5, the first setting button 51 is assigned with the setting item of the color setting, the second setting button 52 to the setting item of the sheet feeding tray, and the third setting button 53 to the setting item of the number of copies, respectively. In addition to the first to third setting buttons 51 to 53, buttons assigned with other setting items may be displayed. However, in this case, the designation of the setting screens of the setting items other than the above-mentioned setting items is performed by pressing the fourth setting button 54.

The start button 65 is a button to instruct the copy start by the operator. The CPU 21 of the operation unit 20 displays the characters of "Start" on the start button 65 of the setting widget 50 according to the SWP. In this example, the operator confirms the current setting values by looking at the current setting values displayed in the respective setting buttons 51 to 53 of the setting widget 50, and performs a press operation of the start button 65. When the start button 65 is pressed (when it is detected that the start button 65 is pressed), the CPU 21 requests the copying operation of the main body 10 (the engine unit 17). Therefore, the main body 10 (the engine unit 17) is configured to perform the copying operation in the current setting values.

In addition, the setting widget 50 of FIGS. 4 and 5 is an example of a setting widget corresponding to the copy function. Similarly to the setting widget 50 of the above-mentioned copy function, the setting widgets corresponding to the other functions such as the scanner function, the facsimile function, and the printer function are configured as setting widgets which display the setting buttons indicating the current setting values and the start button.

Figure 6:
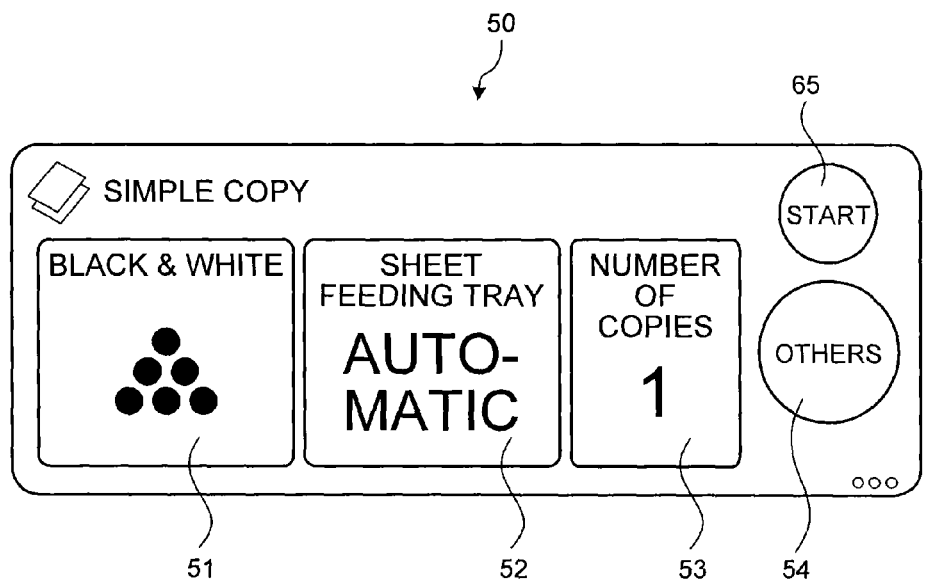
FIG. 6 is a diagram illustrating an example of a setting widget according to a modified example.

In addition, as illustrated in FIGS. 4 and 5, the CPU 21 in the embodiment has been described to display the output result icon 64 in the setting widget 50 to display the output result as an icon, but the invention is not limited thereto. For example, as illustrated in FIG. 6, the CPU 21 may be configured not to display the output result icon 64 in the setting widget 50.

Figure 7:
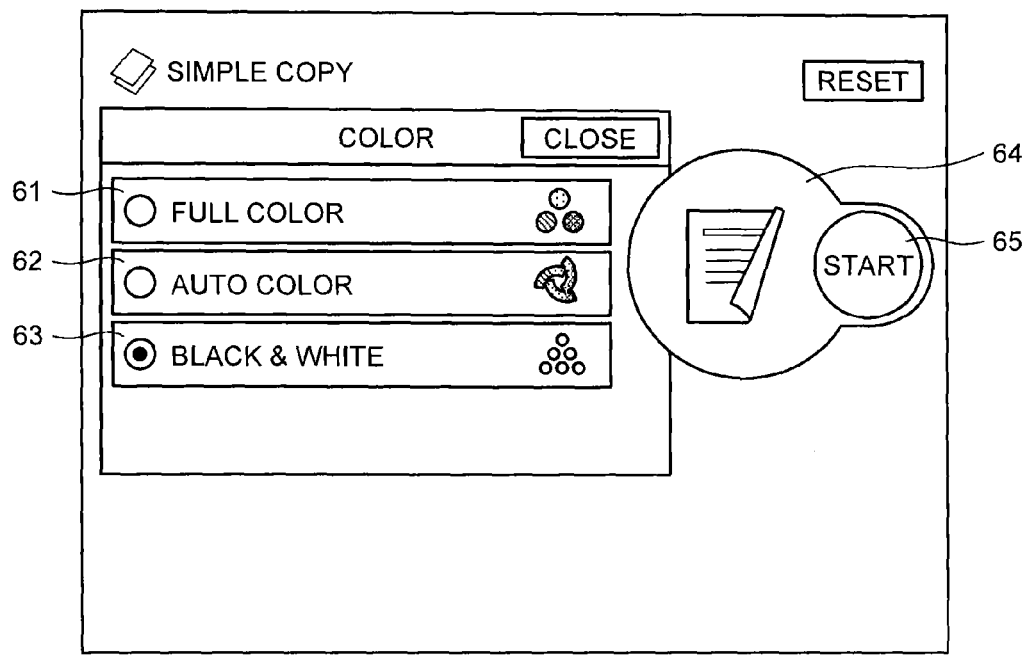
FIG. 7 is a diagram illustrating an example of a color setting screen.

Next, the respective setting screens to be displayed by pressing the respective buttons 51 to 54 of the setting widget 50 will be described. First, FIG. 7 is a diagram illustrating an exemplary display of the color setting screen. When the first setting button 51 of the setting widget 50 is pressed, the CPU 21 of the operation unit 20 displays the color setting screen illustrated in FIG. 7 in the operating panel 27.

Specifically, the CPU 21 displays the respective select buttons 61 to 63 of "Black & White", "Auto color", and "Full color" as illustrated in FIG. 7. Further, as illustrated in FIG. 7, the CPU 21 can also display the output result icon 64 to display the output result as an icon, and the start button 65 to instruct the copy start even in the color setting screen. The operator selects a button corresponding to a desired color setting from among the respective select buttons 61 to 63. The CPU 21 of the operation unit 20 informs the CPU 11 of the main body 10 about the color setting designated through any one of the select buttons 61 to 63. The CPU 11 of the main body 10 stores the color setting set by the operator in the ROM 12, the RAM 13, or the HDD 14 through the copy application stored in the ROM 12. Further, in the example of FIG. 7, when it is detected that the start button 65 is pressed, the CPU 21 of the operation unit 20 requests the copy operation of the main body 10 (the engine unit 17). Therefore, the main body 10 (the engine unit 17) is configured to perform the copy operation in the current color setting.

Figure 8:
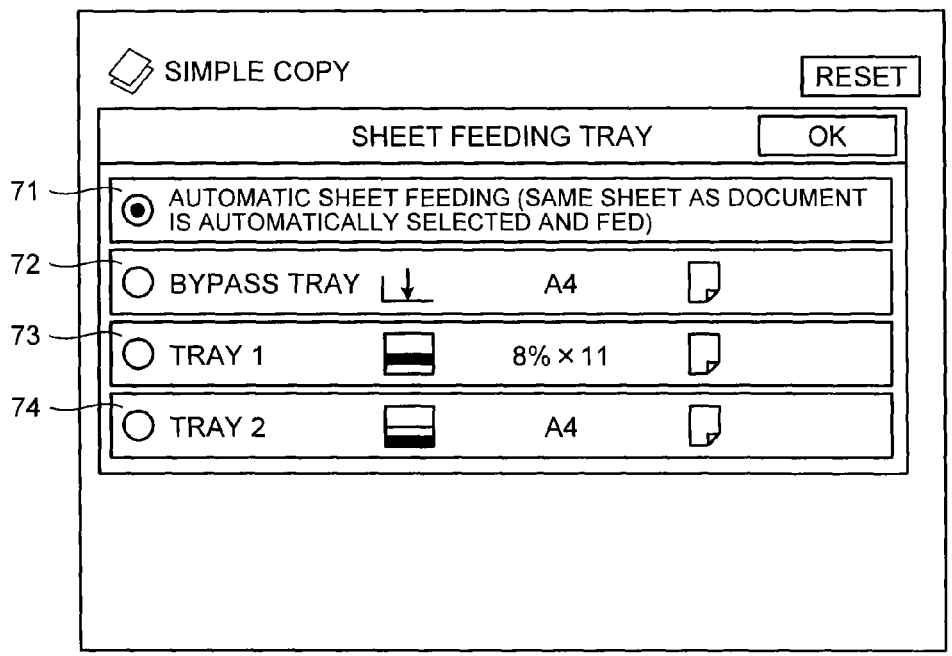
FIG. 8 is a diagram illustrating an example of a tray setting screen.

Next, FIG. 8 is a diagram illustrating an exemplary display of the tray setting screen. When the second setting button 52 of the setting widget 50 is pressed, the CPU 21 of the operation unit 20 displays the tray setting screen illustrated in FIG. 8 on the operating panel 27.

Specifically, the CPU 21 displays the respective select buttons 71 to 74 of "Automatic sheet feeding", "Bypass tray", "Tray 1", and "Tray 2" as illustrated in FIG. 8. The operator selects a button corresponding to a desired tray from which a sheet is fed or a button corresponding to a sheet feeding type from among the respective select buttons 71 to 74. The CPU 21 of the operation unit 20 informs the CPU 11 of the main body 10 about the color setting designated through any one of the select buttons 71 to 74. The CPU 11 of the main body 10 stores the tray setting set by the operator in the ROM 12, the RAM 13, or the HDD 14 through the copy application stored in the ROM 12.

Figure 9:
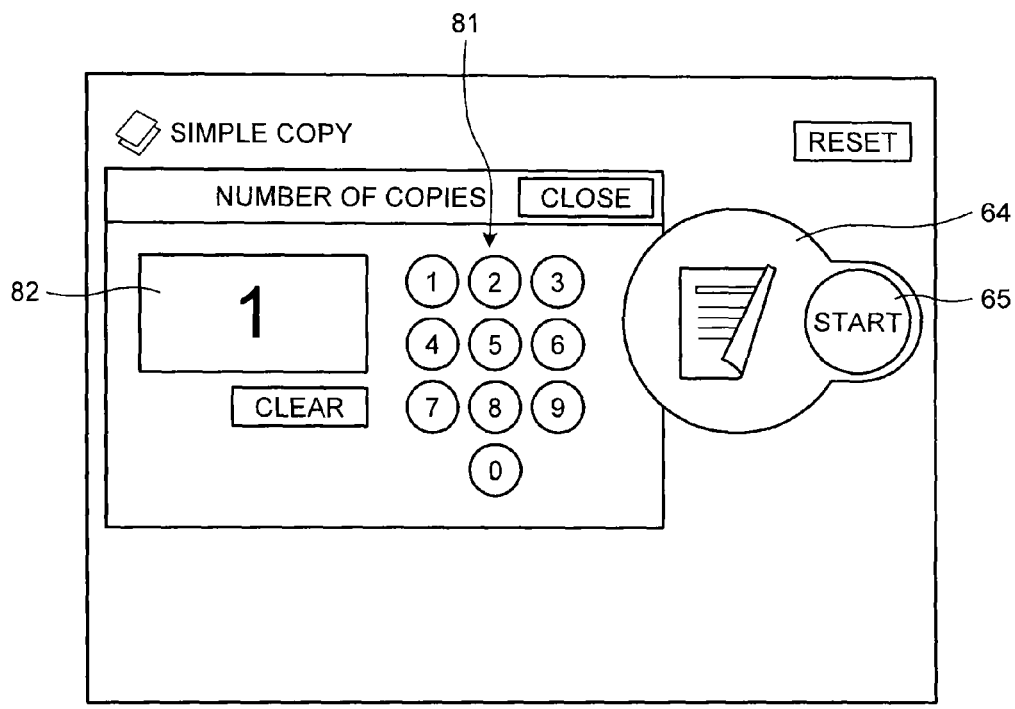
FIG. 9 is a diagram illustrating an example of a copy number setting screen.

Next, FIG. 9 is a diagram illustrating an exemplary display of the copy number setting screen to set the number of copies. When the third setting button 53 of the setting widget 50 is pressed, the CPU 21 of the operation unit 20 displays the copy number setting screen illustrated in FIG. 9 in the operating panel 27.

Specifically, the CPU 21 displays a ten key 81 indicating "0" to "9" as illustrated in FIG. 9 and a copy number display unit 82 showing the currently-set number of copies. Further, as illustrated in FIG. 9, the CPU 21 can display the output result icon 64 to display the output result as an icon and the start button 65 to instruct the copy start even on the copy number setting screen. The operator operates the ten key 81 to designate a desired number of copies. The CPU 21 displays the number of copies designated by operating the ten key 81 in the copy number display unit 82. Further, the CPU 21 informs the CPU 11 of the main body 10 about the number of copies designated by operating the ten key 81. The CPU 11 of the main body 10 stores the number of copies designated by the operator in the ROM 12, the RAM 13, or the HDD 14 through the copy application stored in the ROM 12. Further, when it is detected that the start button 65 is pressed, the CPU 21 of the operation unit 20 requests the copy operation of the main body 10 (the engine unit 17). Therefore, the main body 10 (the engine unit 17) is configured to perform the copy operation in the currently-set number of copies.

Figure 10:
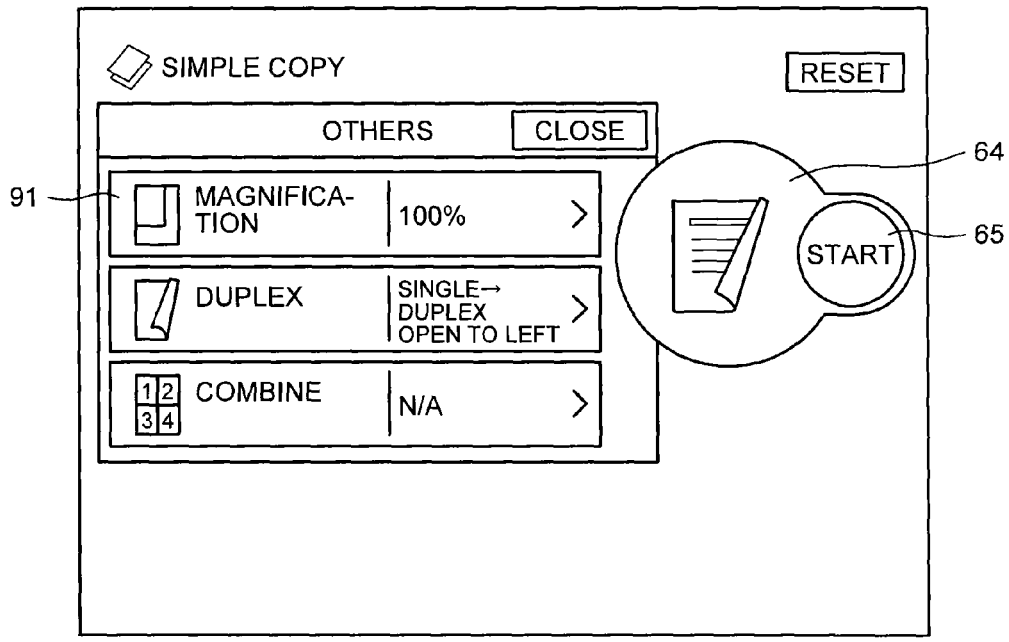
FIG. 10 is a diagram illustrating an example of a setting screen for other setting items.

Next, FIG. 10 is a diagram illustrating an exemplary display of the setting screen through which the CPU 21 displays other setting items when the fourth setting button 54 to designate a display mode of the setting screen of setting items other than the above-mentioned setting items is pressed. In this case, the CPU 21 of the operation unit 20 displays a select button to select the other setting items such as a select button 91 of a "Magnification" setting item which is used to designate rates of magnification and reduction. Further, as illustrated in FIG. 10, the CPU 21 can also display the output result icon 64 to display the output result as an icon and the start button 65 to instruct the copy start on the setting screen.

When the select button 91 or the like is operated to designate the setting item, the CPU 21 displays the setting screen corresponding to the designated setting item. The operator inputs a desired setting value through the setting screen. The CPU 21 informs the CPU 11 of the main body 10 about the setting value of the setting item which is set by the operator. The CPU 11 of the main body 10 stores the setting value of the setting item which is set by the operator in the ROM 12, the RAM 13, or the HDD 14 through the copy application stored in the ROM 12. Further, when it is detected that the start button 65 is pressed, the CPU 21 of the operation unit 20 requests the copy operation of the main body 10 (the engine unit 17). Therefore, the main body 10 (the engine unit 17) is configured to perform the copy operation in the current setting.

Figure 11:
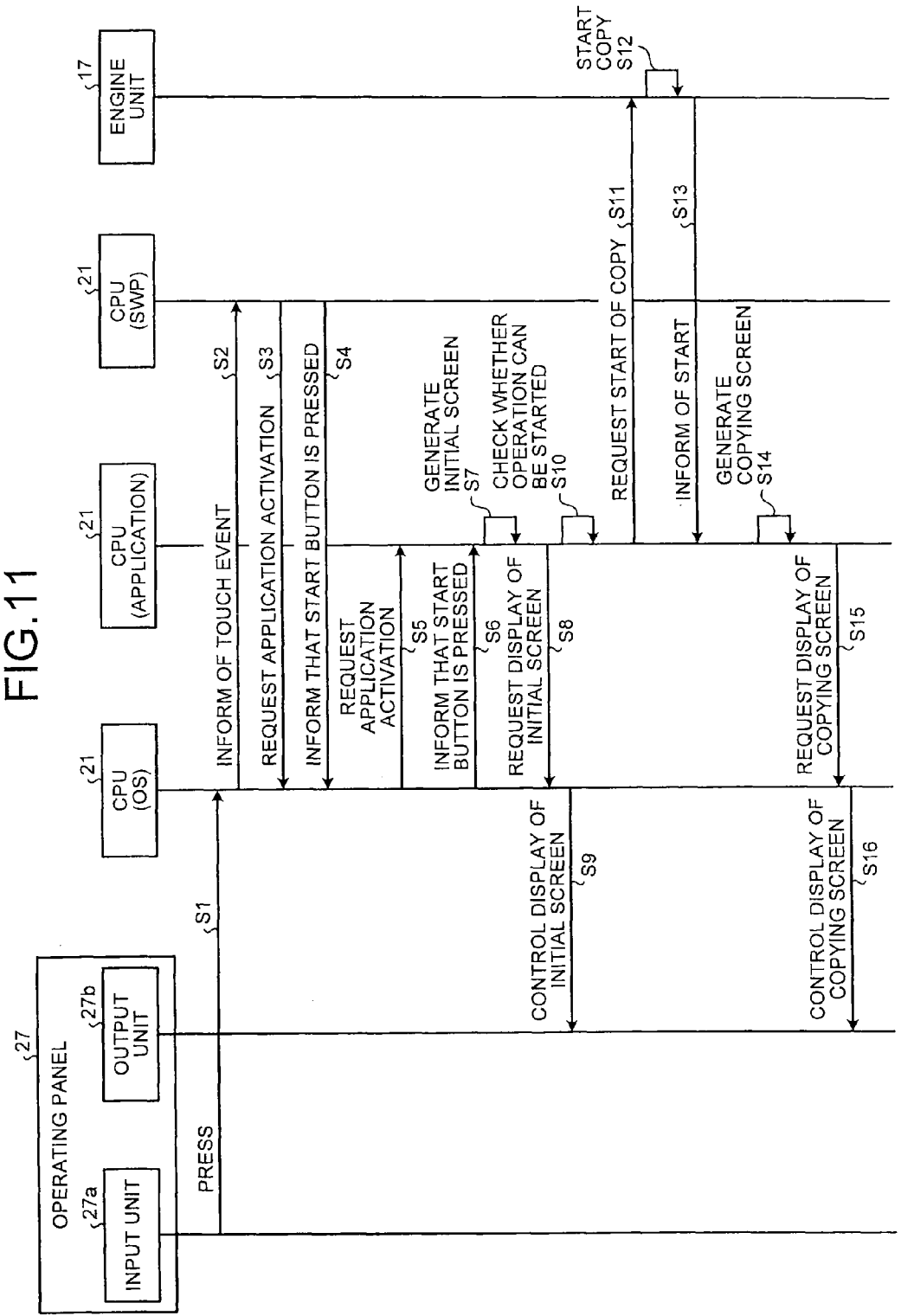
FIG. 11 is a timing chart illustrating an operation example of the MFP until a copy operation is started after a start button disposed in the setting widget corresponding to a copy application is pressed.

Next, FIG. 11 illustrates an exemplary operation of the MFP 1 until the copy operation is started after the start button 65 disposed in the setting widget 50 is pressed. In FIG. 11, an input unit 27a of the operating panel 27 means the touch detector, and an output unit 27b means the liquid crystal display unit. Further, the description "CPU (OS)" shows the operation of the CPU 21 by the OS. Further, the description "CPU (application)" shows the operation of the CPU 21 by the copy application. Furthermore, the description "CPU (SWP)" shows the operation of the CPU 21 by the setting widget program (SWP).

First, when the start button 65 of the setting widget 50 is pressed by the operator, the input unit 27a of the operating panel 27 supplies the detection output of the press to the CPU 21 in Step S1. The CPU 21 receives the detection output of the press, and informs a touch event indicating the occurrence of the press in Step S2.

When the touch event is informed, the CPU 21 performs an activation request for the application (the copy application in this example) corresponding to the start button 65 pressed by the operator in Step S3, and informs the press of the start button 65 corresponding to the copy application in Step S4.

Figure 12:
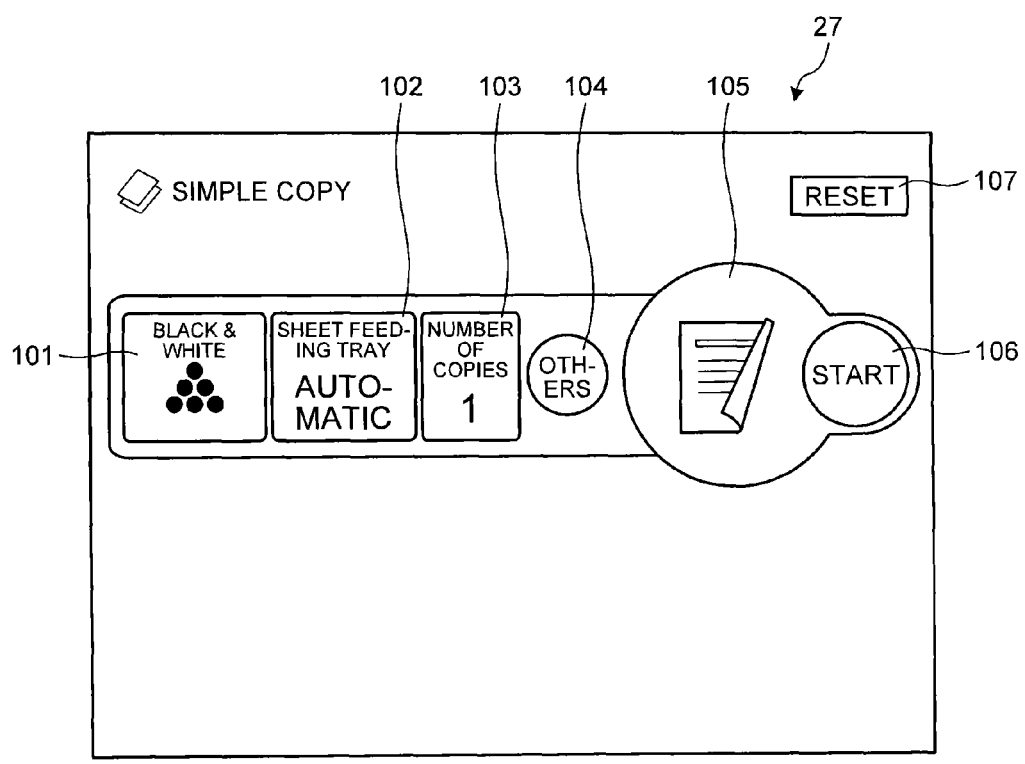
FIG. 12 is a diagram illustrating an example of an initial screen corresponding to the copy application.

Next, the CPU 21 performs the activation request of the copy application in Step S5, and informs the press of the start button 65 in Step S6. When the activation request of the copy application and the press of the start button 65 are informed, the CPU 21 activates the copy application of the activation request. Then, the CPU 21 generates an initial screen of the activated copy application in Step S7, and preforms a display request for the initial screen corresponding to the copy application in Step S8. Then, the CPU 21 controls the initial screen of the display request in Step S9 to be displayed on the output unit 27b of the operating panel 27. Therefore, for example, the initial screen illustrated in FIG. 12 is displayed on the output unit 27b. In the example of FIG. 12, the CPU 21 displays a color setting button 101, a tray setting button 102, a copy number setting button 103, a display designation button 104 for other setting items, an output result icon 105, a start button 106, and a reset button 107 on the initial screen.

In Step S10, when the initial screen as described above is displayed, the CPU 21 checks whether the copy operation can be performed (whether the operation can be started). Then, in Step S11, the CPU 21 requests the copy operation of the main body 10 in the current setting values. In Step S12, the main body 10 (the engine unit 17) which accepts the request starts the copy operation. Then, in Step S13, the main body 10 (the engine unit 17) informs the CPU 21 of the operation unit 20 about that the copy operation is started. In Step S14, the CPU 21 informed of the startup from the main body 10 generates a copy progress screen which shows that the copy is in progress, and performs a display request for the copy progress screen in Step S15. Then, in Step S16, the CPU 21 controls the copy progress screen of the display request to be displayed on the output unit 27b of the operating panel 27.

Figure 13:
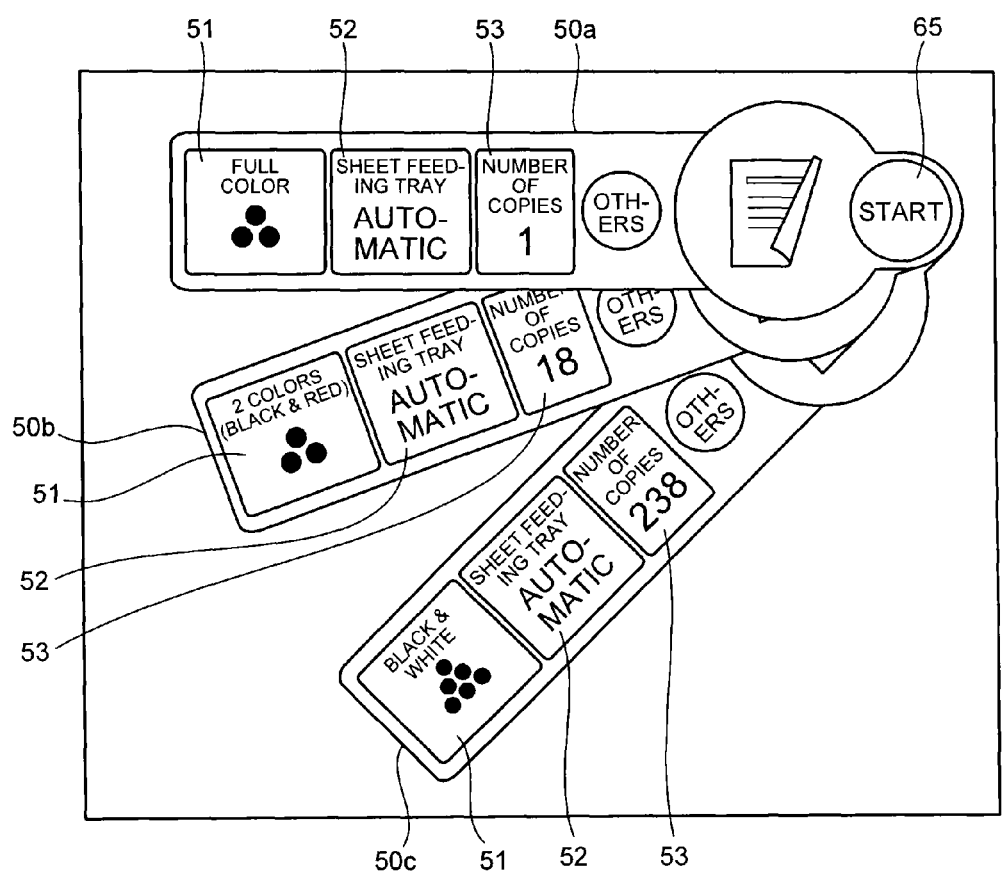
FIG. 13 is a diagram illustrating an exemplary display of the setting widget according to a modified example.

In addition, for example, in a case where the operation unit 20 previously stores a plurality of sets showing combinations of values which are set for the respective setting buttons (the first to third setting buttons 51 to 53 in this example) in the application (the copy application in this example), as illustrated in FIG. 13, the CPU 21 of the operation unit 20 can also simultaneously display a plurality of setting widgets (three setting widgets 50a, 50b, and 50c corresponding to three sets in a one-to-one manner in the example of FIG. 13) which correspond to the plurality of predetermined sets in a one-to-one manner. In this case, when the user touches the setting widget 50 to which a desired value is set, the CPU 21 displays the setting widget 50 to the forefront. Then, when the start button 65 is pressed by the user, the CPU 21 requests the execution of the function (the copy operation in the example of FIG. 13) corresponding to the setting widget 50 from the main body 10 according to the setting values of the respective setting buttons of the setting widget 50 displayed to the forefront.

As described above, in the embodiment, the start buttons which are used to instruct the execution command of the function provided by the application are disposed in each of various types of applications on the home screen displayed on the operating panel 27. Then, when the start button is pressed, the execution of a function corresponding to the pressed start button is started. In other words, in the embodiment, the user can instruct various types of functions which can be executed by the MFP 1 through the home screen. Therefore, it is possible to achieve a beneficial effect of an improvement in operational efficiency for the user.

Program

A program executed in the MFP 1 of the above-mentioned embodiment may be provided using a computer-readable storage medium such as a CD-ROM, a flexible disk (FD), a CD-R, a digital versatile disk (DVD), and a universal serial bus (USB) with a file in an installable or executable format recorded therein. Otherwise, the program may be configured to be provided or distributed through a network such as the Internet. Further, the program may be configured to be provided using a ROM or the like with various types of programs embedded therein in advance.

According to the embodiment, it is possible to improve operational efficiency when a user instructs an execution of a function realizable in a device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
a main body that executes a plurality of functions using a first application layer, a first service layer, and a first operating system; and
an operation device including:
a display to display a screen;
a memory that stores a plurality of applications corresponding respectively to the plurality of functions, the plurality of applications being activated using a second application layer, a second service layer, and a second operating system different from the first operating system; and
circuitry configured to:
arrange, for each of the plurality of functions, a first display component in a home screen for selection of an application to be activated, the first display component being used to instruct an execution command for the each of the plurality of functions; and
activate the application for a function corresponding to the first display component in response to an operation on the first display component, and issue an instruction to execute the function to the first operating system by the activated application.

2. The information processing system according to claim 1, wherein the circuitry is configured to
arrange, for each of the plurality of functions, a third display component in the home screen, the third display component including the first display component and a second display component corresponding to a setting value of the each of the plurality of functions.

3. The information processing system according to claim 2, wherein the circuitry is configured to display, when the second display component is pressed, a setting screen corresponding to the pressed second display component on the display.

4. An information processing method comprising:
executing a plurality of functions using a first application layer, a first service layer, and a first operating system;
storing a plurality of applications corresponding respectively to the plurality of functions, the plurality of applications being activated using a second application layer, a second service layer, and a second operating system different from the first operating system;
arranging, for each of the plurality of functions, a first display component in a home screen for selection of an application to be activated, the first display component being used to instruct an execution command for the each of the plurality of functions;
activating the application for a function corresponding to the first display component in response to an operation on the first display component; and
issuing an instruction to execute the function to the first operating system by using the activated application.

5. A non-transitory computer-readable storage medium with an executable program stored thereon and executed by a computer, wherein the executable program instructs the computer to perform the information processing method according to claim 4.

6. The information processing system according to claim 1, wherein the circuitry is configured to direct the display to display the screen related to the function using the activated application.

7. The information processing apparatus according to claim 6, wherein the circuitry is configured to direct the display to display an initial screen related to the function before directing the main body to execute the function using the activated application, and direct the display to display the screen indicating that the function is in execution after the main body starts executing the function.

8. The information processing apparatus according to claim 1, wherein the circuitry is configured to determine whether or not to execute the function using the activated application.

9. The information processing apparatus according to claim 1, wherein
the circuitry is configured to arrange, for each of the plurality of functions, a second display component corresponding to a setting value of the each of the plurality of functions, when the second display component is pressed, a setting screen corresponding to the pressed second display component is displayed on the display, and the setting screen includes the first display component.

10. The information processing system according to claim 1, wherein communication between the main body and the operation device is performed as communication between communication apparatuses and not as communication between processes in a common apparatus.

* * * * *